(12) United States Patent
Matsumura et al.

(10) Patent No.: US 10,087,602 B2
(45) Date of Patent: Oct. 2, 2018

(54) HOOD DEVICE FOR THE MACHINE ROOM OF A WORKING MACHINE

(71) Applicant: Caterpillar SARL, Geneva (CH)

(72) Inventors: Kazumasa Matsumura, Tokyo (JP); Masanori Tsuji, Tokyo (JP); Keitaro Yokogawa, Hyogo (JP)

(73) Assignee: Caterpillar SARL, Geneva (CH)

( * ) Notice: Subject to any disclaimer, the term of this patent is extended or adjusted under 35 U.S.C. 154(b) by 4 days.

(21) Appl. No.: 15/104,176

(22) PCT Filed: Dec. 16, 2014

(86) PCT No.: PCT/EP2014/077986
§ 371 (c)(1),
(2) Date: Jun. 13, 2016

(87) PCT Pub. No.: WO2015/091501
PCT Pub. Date: Jun. 25, 2015

(65) Prior Publication Data
US 2016/0326719 A1    Nov. 10, 2016

(30) Foreign Application Priority Data
Dec. 17, 2013    (JP) .................................. 2013-260365

(51) Int. Cl.
*E02F 9/00* (2006.01)
*E02F 9/08* (2006.01)
(Continued)

(52) U.S. Cl.
CPC ............ *E02F 9/0891* (2013.01); *B62D 25/10* (2013.01); *B62D 25/12* (2013.01); *E02D 17/13* (2013.01); *E02F 3/32* (2013.01)

(58) Field of Classification Search
None
See application file for complete search history.

(56) References Cited

U.S. PATENT DOCUMENTS 5,327,988 A    7/1994 Lenz et al.
2002/0017408 A1    2/2002 Oshikawa et al.
(Continued)

FOREIGN PATENT DOCUMENTS

EP    1719865 A2    11/2006
JP    58-183362 A    10/1983
(Continued)

OTHER PUBLICATIONS

European Patent Office, International Search Report in International Patent Application No. PCT/EP2014/077986, dated Feb. 25, 2015, 4 pages.
(Continued)

*Primary Examiner* — John D Walters
*Assistant Examiner* — Hilary L Johns

(57) ABSTRACT

A first hood member is fixed to an upper side opening edge of machine room and a second hood member is adjacently fixed to the upper side opening edge. The first hood member includes a reinforcing deformation part disposed along one notch-like edge portion positioned above a part adjacent to second hood member and has a protruded-shape cross section upward; and a pressing portion disposed at one notch-like edge portion along the reinforcing deformation part and protruding downward. The second hood member includes a pressed groove portion disposed corresponding to the pressing portion and has a recessed-shape cross section upward.

9 Claims, 6 Drawing Sheets

(51) Int. Cl.
   *B62D 25/10*   (2006.01)
   *E02D 17/13*   (2006.01)
   *B62D 25/12*   (2006.01)
   *E02F 3/32*    (2006.01)

(56) References Cited

U.S. PATENT DOCUMENTS

| | | | |
|---|---|---|---|
| 2004/0084924 A1 | 5/2004 | Albright et al. | |
| 2005/0284678 A1* | 12/2005 | Muia-Longman | B62D 25/10 180/69.21 |
| 2006/0000660 A1* | 1/2006 | Moen | B62D 25/10 180/309 |
| 2014/0299401 A1* | 10/2014 | Nakagami | E02F 9/0866 180/309 |
| 2015/0284032 A1* | 10/2015 | Hanson | B62D 25/182 180/89.17 |

FOREIGN PATENT DOCUMENTS

| | | | |
|---|---|---|---|
| JP | 58183362 A | * | 10/1983 |
| JP | 08-254299 A | | 10/1996 |
| JP | 11-158915 A | | 6/1999 |
| JP | 2000-186343 A | | 7/2000 |
| JP | 2002-129592 A | | 5/2002 |
| JP | 2002-327456 A | | 11/2002 |
| JP | 2002-356875 A | | 12/2002 |
| JP | 2005-125951 A | | 5/2005 |
| JP | 2006-056326 A | | 3/2006 |
| JP | 2008-111255 A | | 5/2008 |
| JP | 2008111255 A | * | 5/2008 |
| JP | 2008-168780 A | | 7/2008 |
| JP | 2013-076264 A | | 4/2013 |
| JP | 2013-076265 A | | 4/2013 |
| WO | WO 2012/081496 A1 | | 6/2012 |

OTHER PUBLICATIONS

European Patent Office, Written Opinion in International Patent Application No. PCT/EP2014/077986, dated Feb. 25, 2015, 7 pages.

* cited by examiner (a)

(b)

HOOD DEVICE FOR THE MACHINE ROOM OF A WORKING MACHINE

CROSS-REFERENCE TO RELATED APPLICATIONS

This application is a national phase application of International Patent Application No, PCT/EP2014/077986, filed Dec. 16, 2014, which claims priority to Japanese Patent Application No. 2013-260365, filed Dec. 17, 2013, both of which are incorporated by reference herein in their entireties for all purposes.

TECHNICAL FIELD

The present invention relates to a divided hood device with a plurality of hood members and also relates to a working machine with the hood device.

BACKGROUND ART

In a machine room in a construction machine, an engine is installed and a cooling package is also installed adjacently to the engine. The size of the cooling package is increased to satisfy tightened regulations on exhaust gas discharged from the engine (enhanced cooling capability). Correspondingly, the size of an engine hood is increased which covers an upper opening of the machine room and which bulges upward and which is open at a lower side thereof. Thus, the engine hood is heavy, and more time and effort are needed for a service technician to open and close the engine hood for such as engine maintenance.

An engine hood configured as follows to deal with the above-described problem is known. The engine hood is laterally divided into two hood members each attached at a laterally outer lower edge portion thereof to an upper opening edge of the machine room via a hinge so that the hood members rotationally move laterally outward to open (see, for example, Patent Literature 1).

In the divided engine hood, each of the hood members has a reduced size and a reduced weight, thus enabling a reduction in time and effort needed for the service technician in opening and closing the hood members.

[Patent Literature 1] Japanese Patent Application Laid-open No. H8-254299

In the divided engine hood, when the right and left hood members are closed, the cutout edge portions of the hood members lie opposite and contact each other. However, no means is provided for fixing the cutout edge portions together, and thus, if the construction machine is subjected to intense vibration, the hood members may disadvantageously vibrate.

That is, when the hood members are closed, a lock member such as a latch which is provided at a front lower edge portion of the hood may be used to fix the front lower edge portion of the hood to the upper opening edge of the machine room. However, a rear lower edge portion of the hood fails to be fixed to the upper opening edge of the machine room via the lock member because a counterweight positioned behind the machine room becomes an obstacle to the fixation. The hood members with the cutout edge portion and the rear lower edge portion of the hood unfixed are likely to vibrate.

Furthermore, in order to reliably fix the hood members to suppress vibration, an attempt has been made to install, above the engine, a beam member that can receive leading end portions of the hood members at a lower side thereof and to fix the hood members to the beam member via bolts. However, such a beam member makes engine maintenance operations and the like difficult.

Disclosure of the Invention

With the foregoing in view, it is an object of the present invention to provide a hood device that allows a plurality of hood members to be fixed at an upper side of a machine room without the use of a beam member provided above the engine, and a working machine with the hood device.

An invention according to claim 1 is a hood device including: a first hood member which bulges upward and which is open at a lower side thereof, the first hood member being provided at a part of an upper opening of a machine room so as to be able to be opened and closed and being fixed to an upper opening edge of the machine room in a closed state; and a second hood member which bulges upward and which is open at a lower side thereof, the second hood member including a part that is located adjacent to the first hood member and that overlaps a part of the first hood member, the second hood member being provided at another part of the upper opening of the machine room so as to be able to be opened and closed and being fixed to the upper opening edge of the machine room in a closed state, wherein the first hood member includes: a first cutout edge portion formed by cutting out a partial side of the first hood member to be an opening and laid on top of the second hood member; and a pressing portion provided along the first cutout edge portion so as to project downward, and the second hood member includes: a second cutout edge portion formed by cutting out a partial side surface positioned under the first cutout edge portion to be an opening; and a groove portion to be pressed, formed along a second cutout edge portion and at a position corresponding to the pressing portion of the first hood member, the groove portion to be pressed having an upward-facing recessed cross section.

An invention according to claim 2 is the hood device according to claim 1, wherein the first hood member includes a reinforcement deformation portion having a recessed cross section and provided along the first cutout edge portion.

An invention according to claim 3 is the hood device according to claim 2, wherein the first hood member includes a tubular reinforcement structure formed by integrating a band-like reinforcement plate along the reinforcement deformation portion.

An invention according to claim 4 is the hood device according to any one of claims 1 to 3, wherein the first hood member includes: a first hingedly support portion that hingedly supports one of two lower edge portions positioned across the first cutout edge portion, at the upper opening edge of the machine room so that the first hood member is able to be opened and closed; and a first fixing portion that fixes the other of the two lower edge portions positioned across the first cutout edge portion, to the upper opening edge of the machine room, and the second hood member includes: a second hingedly support portion that hingedly supports the lower edge portion positioned opposite the second cutout edge portion, at the upper opening edge of the machine room so that the second hood member is able to be opened and closed; and a second fixing portion that fixes the lower edge portion positioned between the second cutout edge portion and the lower edge portion provided with the second hingedly support portion, to the upper opening edge of the machine room.

An invention according to claim 5 is the hood device according to any one of claims 1 to 4, wherein the pressing portion of the first hood member is a resilient seal member.

An invention according to claim 6 is a working machine including: a machine body; and a working machine mounted on the machine body, the working machine further including: a machine room provided in the machine body; an engine installed in the machine room; a cooling unit installed in the machine room adjacently to an engine; and the hood device according to any one of claims 1 to 5 provided at an upper opening of the machine room so as to be able to be opened and closed, wherein a first hood member of the hood device is a hood member covering the engine from a top thereof, and second hood member is a hood member covering the cooling unit from a top thereof.

In the invention according to claim 1, the plurality of hood members is provided at the upper opening of the machine room so as to be each able to be opened and closed. This enables a reduction in the size and weight of each of the hood members and thus in the time and effort needed to open and close the hood. Furthermore, the pressing portion provided along the cutout edge portion of the second hood member so as to project downward presses the groove portion to be pressed, formed along the cutout edge portion of the second hood member and having an upward-facing recessed cross section. This provides strength for the cutout edge portions at which the first hood member and the second hood member overlap. Furthermore, displacement and vibration caused by vibration of the hood members and the like can be suppressed, and the first and second hood members can be reliably fixed to the upper side of the machine room without the use of a beam member provided above the engine.

In the invention according to claim 2, the reinforcement deformation portion provided along the cutout edge portion of the first hood member and having a recessed cross section enables an increase in the strength of the cutout edge portions at which the first hood member presses the second hood member.

In the invention according to claim 3, the tubular reinforcement structure formed by integrating the band-like reinforcement plate along the reinforcement deformation portion of the first hood member enables an increase in the strength against a possible bend or twist of the cutout edge portions where the first hood member presses the second hood member. Thus, vibration of the second hood member can be effectively suppressed.

In the invention according to claim 4, the first hood member uses the first hingedly support portion to hingedly support one of the two lower edge portions positioned across one of the cutout edge portions, at the upper opening edge of the machine room so that the first hood member can be opened and closed, and uses the first fixing portion to fix the other of the two lower edge portions to the upper opening edge of the machine room. The second hood member uses the second hingedly support portion to hingedly support the lower edge portion positioned opposite the second cutout edge portion, at the upper opening edge of the machine room so that the second hood member can be opened and closed, and uses the second fixing portion to fix the lower edge portion positioned between the second cutout edge portion and the lower edge portion with the second hingedly support portion, to the upper opening edge of the machine room. Thus, when the first hood member and the second hood member are closed, each of the first and second hood members can be fixed to the upper opening edge of the machine room in three directions to suppress vibration. Consequently, the first hood member and the second hood member can be reliably fixed to the upper side of the machine room without the use of a beam member provided above the engine, allowing the operability of maintenance of the engine and the like to be improved.

In the invention according to claim 5, the pressing portion of the first hood member is the resilient seal member. Thus, with the seal member absorbing vibration, the groove portion to be pressed of the second hood member as a whole can be evenly pressed. This allows reliable prevention of displacement of the cutout edge portion of the second hood member from the cutout edge portion of the first hood member.

In the invention according to claim 6, the first hood member of the hood device is a hood member located, in a covering manner, above the engine installed in the machine room, and the second hood member is a hood member located, in a covering manner, above the cooling unit installed in the machine room adjacently to the engine. It is thus possible to easily deal with the increased size of the hood member located above the cooling unit in a covering manner, which size results from the increased size of the cooling unit associated with the regulations on exhaust gas, enabling a reduction in the time and effort needed to open and close the hood device. Furthermore, the hood device can be provided with strength sufficient to withstand vibration of the working machine, allowing a plurality of hood members to be reliably fixed to the upper side of the machine room without the use of a beam member provided above the engine.

BRIEF DESCRIPTION OF THE DRAWINGS

FIG. 3 is a perspective view of the hood device, in which FIG. 3(a) depicts that first and second hood members are closed and FIG. 3(B) depicts that the first hood member is open.

BEST MODE FOR CARRYING OUT THE INVENTION

The present invention will be described below in detail using an embodiment depicted in FIGS. 1 to 9.

Figure 9:
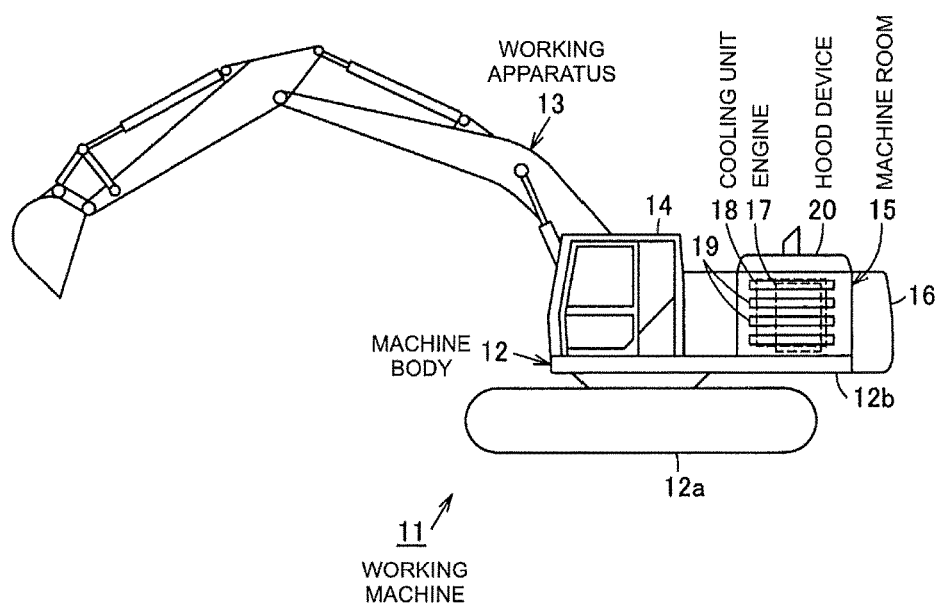
FIG. 9 is a side view of a working machine with the hood device.

FIG. 9 depicts a working machine (excavator) 11. A machine body 12 of the working machine 11 includes a lower traveling body 12a and an upper slewing body 12b provided so as to be able to slew with respect to the lower traveling body 12a, The upper slewing body 12b includes a working apparatus 13 and a cab 14 forming an operating room for an operator. A machine room 15 is provided behind the working apparatus 13 and the cab 14. A counterweight 16 is detachably installed behind the machine room 15.

An engine 17 is installed in the machine room 15. A cooling package 18 as a cooling unit is installed in the machine room 15 adjacently to the engine 17. The cooling package 18 is an assembly of a radiator used to cool the engine, an oil cooler used to cool hydraulic oil, an intercooler used to cool a supercharger, and the like. The cooling package 18 is disposed in a cold air channel for cold air sucked through a ventilation port 19 in a side surface of the machine body by a cooling fan (not depicted in the drawings) driven by the engine 17 or a motor. A hood device 20 is provided at an upper opening of the machine room 15 so as to be able to be opened and closed.

Figure 2:
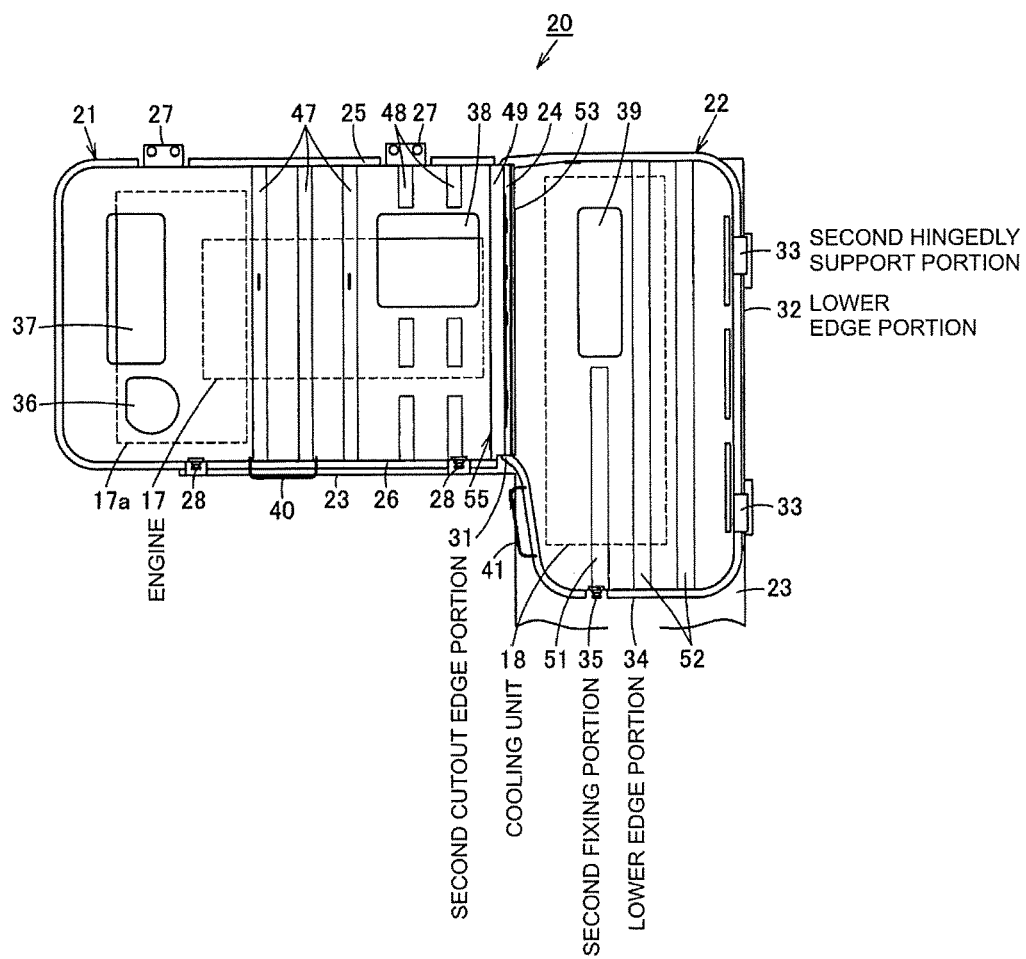
FIG. 2 is a top view of the hood device.
Figure 3:
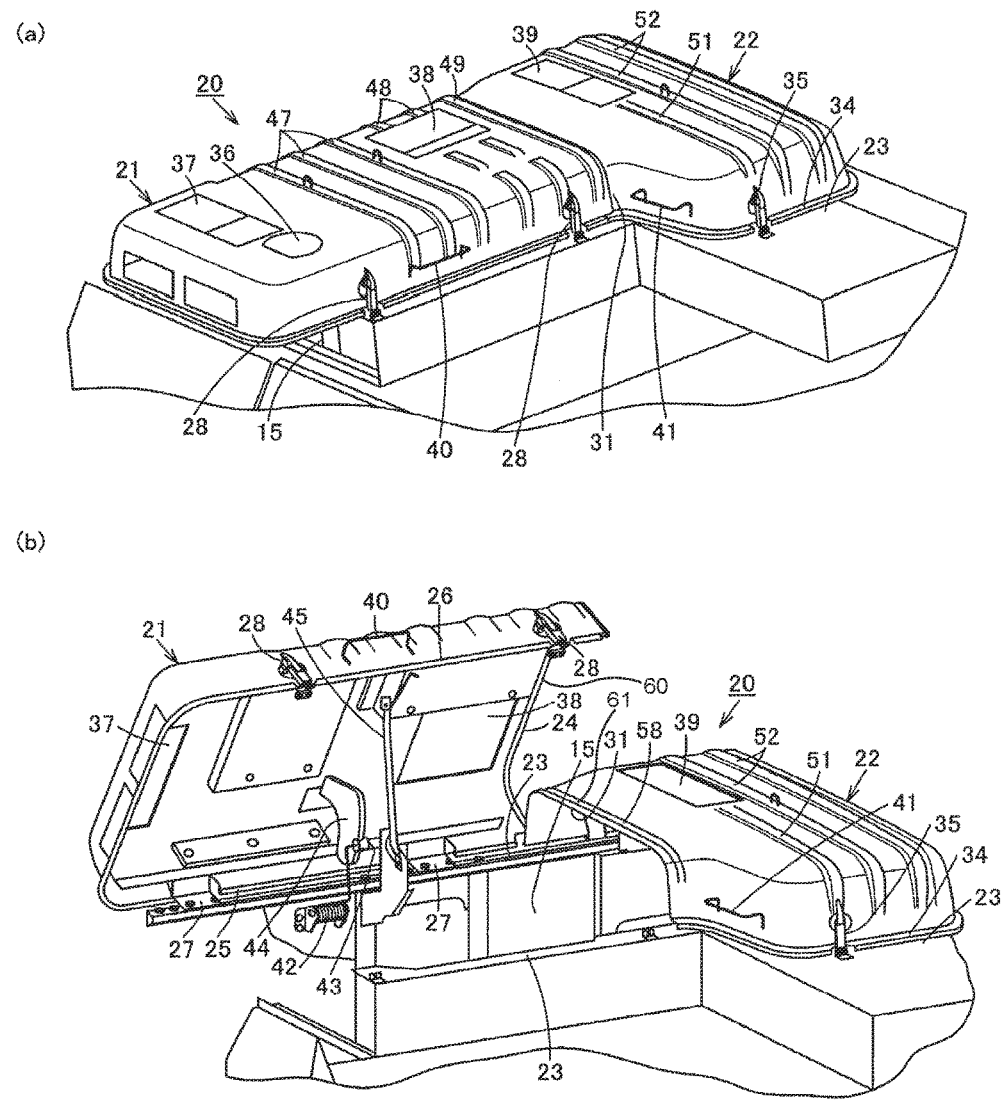
Figure 4:
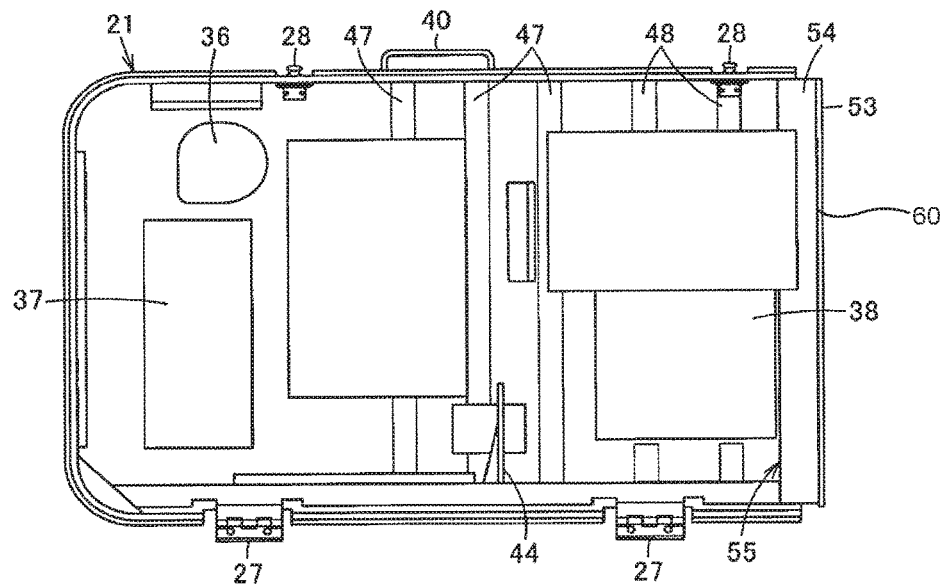
FIG. 4 is a bottom view of the first hood member of the hood device.

As depicted in FIG. 2, the first hood member 21 has a partial side surface 60 adjacent to the second hood member and open so as to form a first cutout edge portion 24 that overlaps an upper side of the second hood member 22. One (lower edge portion 25) of two lower edge portions 25 and 26 positioned across the cutout edge portion 24 is hingedly supported at the upper opening edge 23 of the machine room 15 by a first hingedly support portion 27 so that the first hood member 21 can be opened and closed. The other (lower edge portion 26) of the two lower edge portions 25 and 26 is fixed to the upper opening edge 23 of the machine room 15 by a first fixing portion 28.

The second hood member 22 has a second cutout edge portion 31 formed by defining a partial side surface 61 of the second hood member 22 positioned under the first cutout edge portion 24 into an opening. A lower edge portion 32 positioned opposite the second cutout edge portion 31 is hingedly supported at the upper opening edge 23 of the machine room 15 by a second hingedly support portion 33 so that the second hood member 22 can be opened and closed. A front lower edge portion 34 positioned between the second cutout edge portion 31 and the lower edge portion 32 with the second hingedly support portion 33 is fixed to the upper opening edge 23 of the machine room 15 by a second fixing portion 35.

The first hingedly support portion 27 and the second hingedly support portion 33 are each a pair of hinges. Furthermore, the first fixing portion 28 and the second fixing portion 35 are each a fastener including a detachable bracket attached to the hood for an engagement portion attached to a machine body frame side and a lever having a cam function to tighten and loosen the bracket.

The first hood member 21 has a hole 36 through which an exhaust tube is drawn out and exhaust ports 37 and 38 through which an wind from a cooling fan in the machine room 15 is discharged. The second hood member 22 also has an exhaust port 39 through which a wind from a cooling fan in the machine room 15 is discharged to the outside.

As depicted in FIG. 3(a), the first hood member 21 includes a first handle 40 on a front side surface thereof. Furthermore, the second hood member 22 has a second handle 41 on a side surface thereof which is continuous with the cutout edge portion 31 adjacent to the first hood member 21.

As depicted in FIG. 3(b), a torsion spring 42 is installed inside the machine room 15, and a grooved roller 43 rotatably supported at a leading end portion of the torsion spring 42 is movably engaged with a rail member 44 attached to a ceiling surface of the first hood member 21. A restoring force of the torsion spring 42 biases and pushes up the first hood member 21 to reduce the weight of the first hood member 21. This reduces an operating force needed to open or close the first hood member 21 with the handle 40 held by the hand.

Figure 1:
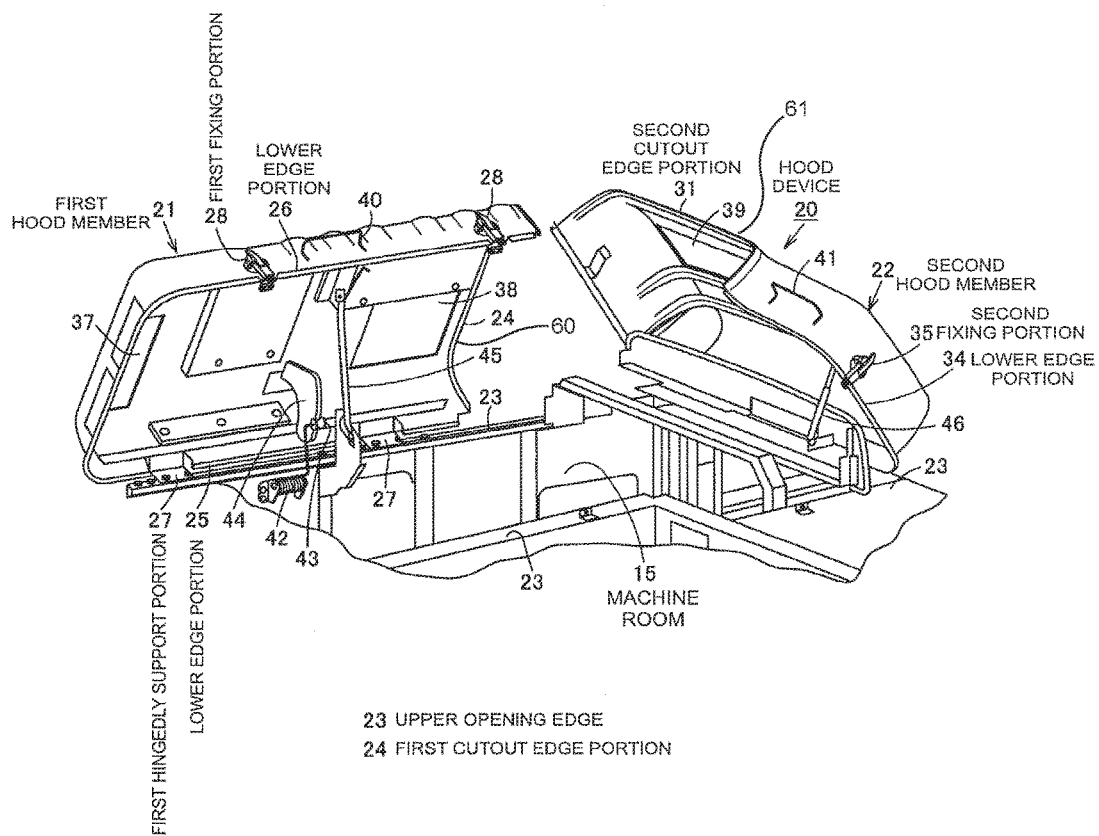
FIG. 1 is a perspective view depicting an embodiment of a hood device according to the present invention.

As depicted in FIG. 1, the first hood member 21 and the second hood member 22 include locking rods 45 and 46 detachably provided respectively to hold the hood members at a predetermined opening angle.

As depicted in FIGS. 1 to 5, the first hood member 21 includes a plurality of rows of reinforcement deformation portions 47, 48, and 49 formed continuously or discontinuously from the front side surface through a top plate surface to a rear side surface and having an upward-facing protruding cross section. The second hood member 22 also includes a plurality of rows of reinforcement deformation portions 51 and 52 formed continuously from a front side surface through a top plate surface to a rear side surface and having an upward-facing protruding cross section.

Figure 5:
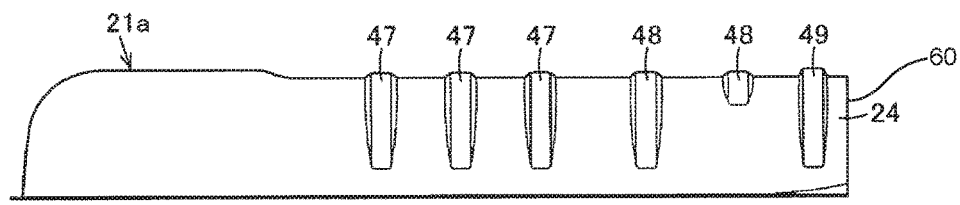
FIG. 5 is a front view of the first hood member of the hood device.
Figure 6:
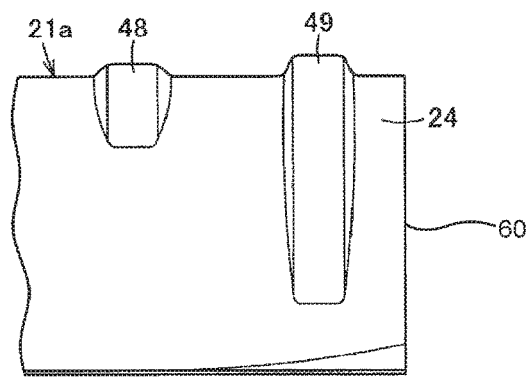
FIG. 6 is an enlarged front view of an end portion of the first hood member of the hood device.
Figure 7:
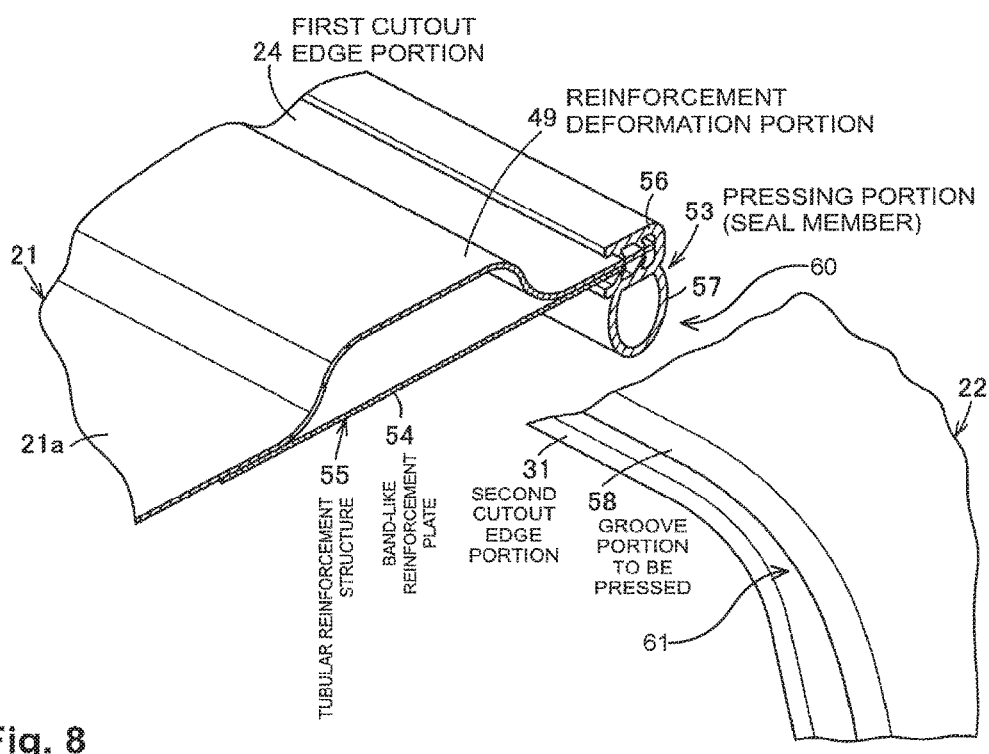
FIG. 7 is a cross-sectional view and a perspective view depicting a state immediately before the first and second hood members of the hood device are laid on top of each other.
Figure 8:
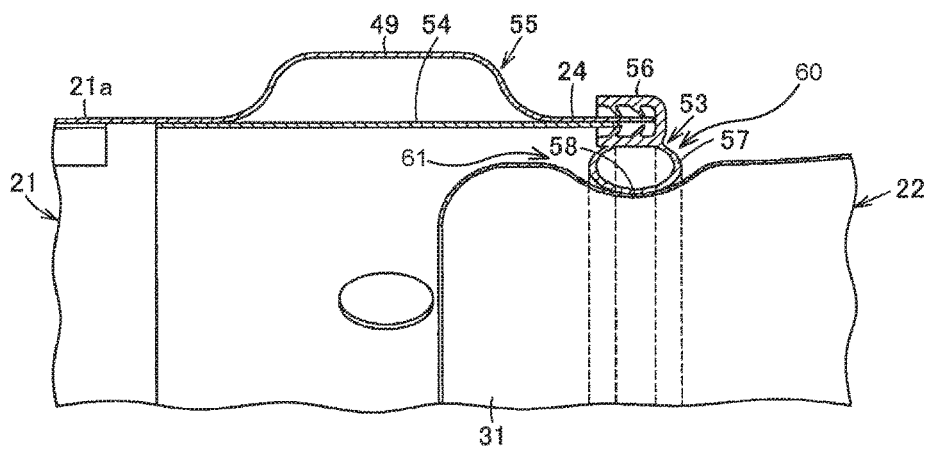
FIG. 8 is a cross-sectional view depicting that the two hood members of the hood device overlap.

As depicted in FIG. 5 and FIG. 6, the first hood member 21 is formed by performing machining depicted in FIG. 7 and FIG. 8 on a hood base material 21a shaped by partly cutting out an existing hood member (not depicted in the drawings) and adding, to the resultant hood member, the reinforcement deformation portion 49, which is provided continuously along the first cutout edge portion 24 positioned on the upper side of a part of the hood member adjacent to the second hood member 22 and which has an upward-facing protruding cross section. The reinforcement deformation portion 49 has a cross section shaped to project upward higher than the other reinforcement deformation portions 47 and 48.

The cutout edge portion 24 of the first hood member 21 is an edge portion overlapping the upper side of the adjacent cutout edge portion 31 of the second hood member 22. The reinforcement deformation portion 49 is formed to extend continuously along the first cutout edge portion 24. A pressing portion 53 projecting downward into the first cutout edge portion 24 is provided continuously along the reinforcement deformation portion 49. Furthermore, a hollow tubular reinforcement structure 55 with strength against a bend or twist is formed by integrating a band-like reinforcement plate 54 along and under the reinforcement deformation portion 49 by means of welding or the like.

The pressing portion 53 may be formed by machining the cutout edge portion 24 of the first hood member 21 so that the cutout edge portion 24 projects downward. However, the pressing portion 53 is preferably formed of a resilient seal member in order to prevent the first hood member 21 and the second hood member 22 from coming into direct contact with each other to prevent infiltration of rainwater and generation of noise. The seal member as the pressing portion 53 is integrally formed by a fitting portion 56 that fits over the cutout edge portion 24 of the first hood member 21 and a tubular portion 57 that comes into tight contact with the second hood member 22.

The second hood member 22 includes a groove portion to be pressed 58 formed continuously along the second cutout edge portion 31 positioned under the first cutout edge portion 24, at a position corresponding to the pressing portion 53 of the first hood member 21, the groove portion to be pressed 58 having an upward recess cross section.

Advantageous effects of the depicted embodiment will be described.

When a maintenance operation or the like is performed on the engine 17 and the cooling package 18, as depicted in FIG. 1, the first fixing portion 28 and the second fixing portion 35 are released to swiftly open the first hood member 21 and the second hood member 22 upward, respectively.

The first hood member 21 and the second hood member 22 are then locked using the locking rods 45 and 46, respectively.

When the maintenance operation or the like ends, first, the second hood member 22 is closed and locked using the second fixing portion 35 as depicted in FIG. 3(b). Then, the first hood member 21 is closed and locked using the first fixing portion 28 as depicted in FIG. 3(a). At this time, as depicted in FIG. 8, the pressing portion (seal member) 53 provided at the cutout edge portion 24 of the first hood member 21 presses the groove portion to be pressed 58 of the second hood member 22 to press a peripheral portion of the second hood member 22 against the upper opening edge 23 of the machine room 15. This suppresses vibration of the second hood member 22.

The plurality of hood members 21 and 22 is provided at the upper opening of the machine room 15 so as to be able to be opened and closed. This enable a reduction in the size and weight of each of the hood members 21 and 22 and thus in the time and effort needed to open and close the hood. Furthermore, the pressing portion 53 provided along the cutout edge portion 24 of the first hood member 21 so as to project downward presses the groove portion to be pressed 58 provided along the cutout edge portion 31 of the second hood member 22 and having an upward-facing recessed cross section. This provides strength for the cutout edge portions 24 and 31 where the first hood member 21 and the second hood member 22 overlap, and allows suppression of displacement and flapping caused by vibration of the hood member 22. Thus, the first hood member 21 and the second hood member 22 can be reliably fixed to the upper side of the machine room 15 without the use of a beam member provided above the engine.

The reinforcement deformation portion 49 provided continuously along the cutout edge portion 24 of the first hood member 21 and having a recessed cross section enables an increase in the strength of the cutout edge portion 24 where the first hood member 21 presses the second hood member 22.

The first hood member 21 includes the tubular reinforcement structure 55 formed by integrating the band-like reinforcement plate 54 along and under the reinforcement deformation portion 49. Thus, the tubular reinforcement structure 55 enables an increase in the strength against a possible bend or twist of the cutout edge portion 24 where the first hood member 21 presses the second hood member 22. This allows vibration of the second hood member 22 to be effectively suppressed.

The first hood member 21 uses the first hingedly support portion 27 to hingedly support one of the two lower edge portions 25 and 26 positioned across the first cutout edge portion 24, at the upper opening edge 23 of the machine room 15 so that the first hood member 21 can be opened and closed, and uses the first fixing portion 28 to fix the other (the lower edge portions 26) of the lower edge portions 25 and 26 to the upper opening edge 23 of the machine room 15. The second hood member 22 uses the second hingedly support portion 33 to hingedly support the lower edge portion 32 positioned opposite the second cutout edge portion 31, at the upper opening edge 23 of the machine room 15 so that the second hood member 22 can be opened and closed, and uses the second fixing portion 35 to fix the lower edge portion 34 positioned between the second cutout edge portion 31 and the lower edge portion 32 with the second hingedly support portion 33, to the upper opening edge 23 of the machine room 15. Thus, when the first hood member 21 and the second hood member 22 are closed, each of the first and second hood members 21 and 22 can be fixed to the upper opening edge 23 of the machine room 15 in three directions to suppress vibration. Consequently, the first hood member 21 and the second hood member 22 can be reliably fixed to the upper side of the machine room 15 without the use of a beam member provided above the engine, allowing the operability of maintenance of the engine 17 and the like to be improved.

The pressing portion 53 of the first hood member 21 is the resilient seal member. Thus, with the seal member absorbing vibration, the groove portion to be pressed 58 of the second hood member 22 as a whole can be evenly pressed. This allows reliable prevention of displacement of the cutout edge portion 31 of the second hood member 22 from the cutout edge portion 24 of the first hood member 21.

The first hood member 21 of the hood device 20 is a hood member located, in a covering manner, above the engine 17 installed in the machine room 15 provided in the machine body 12 of the working machine 11, and the second hood member 22 is a hood member located, in a covering manner, above the cooling package 18 installed in the machine room 15 adjacently to the engine 17. It is thus possible to easily deal with the increased size of the hood member 22 located above the cooling package 18 in a covering manner, which size results from the increased size of the cooling package 18 associated with the regulations on exhaust gas, enabling a reduction in the time and effort needed to open and close the hood device 20. Furthermore, the hood device 20 can be provided with strength sufficient to withstand vibration of the working machine 11, allowing the plurality of hood members 21 and 22 to be reliably fixed to the upper side of the machine room 15 without the use of a beam member provided above the engine.

INDUSTRIAL APPLICABILITY

The present invention has industrial applicability for companies involved in manufacture, distribution, and the like of hood devices or working machines.

EXPLANATION OF REFERENCE NUMERALS

11 Working machine
12 Machine body
13 Working apparatus
15 Machine room
17 Engine
18 Cooling package as cooling unit
20 Hood device
21 First hood member
22 Second hood member
23 Upper opening edge
24 First cutout edge portion
25 Lower edge portion
26 Lower edge portion
27 First hingedly support portion
28 First fixing portion
31 Second cutout edge portion
32 Lower edge portion
33 Second hingedly support portion
34 Lower edge portion
35 Second fixing portion
49 Reinforcement deformation portion
53 Pressing portion (seal member)
54 Band-like reinforcement structure
55 Tubular reinforcement structure
58 Groove portion to be pressed

The invention claimed is:

1. A hood device comprising:
a first hood member which bulges upward and which is open at a lower side thereof, the first hood member being provided at a part of an upper opening of a machine room so as to be able to be opened and closed and being fixed to an upper opening edge of the machine room in a closed state; and
a second hood member which bulges upward and which is open at a lower side thereof, the second hood member including a part that is located adjacent to the first hood member and that overlaps a part of the first hood member, the second hood member being provided at another part of the upper opening of the machine room so as to be able to be opened and closed and being fixed to the upper opening edge of the machine room in a closed state, wherein
the first hood member comprises:
a first cutout edge portion formed by cutting out a partial side of the first hood member to be an opening and laid on top of the second hood member;
a pressing portion provided along the first cutout edge portion so as to project downward,
a first hingedly support portion that hingedly supports one of two lower edge portions positioned across the first cutout edge portion, at the upper opening edge of the machine room so that the first hood member is able to be opened and closed; and
a first fixing portion that fixes the other of the two lower edge portions positioned across the first cutout edge portion, to the upper opening edge of the machine room, and
the second hood member comprises:
a second cutout edge portion formed by cutting out a partial side surface positioned under the first cutout edge portion to be an opening;
a groove portion to be pressed, formed along the second cutout edge portion and at a position corresponding to the pressing portion of the first hood member, the groove portion to be pressed having an upward-facing recessed cross section;
a second hingedly support portion that hingedly supports the lower edge portion positioned opposite the second cutout edge portion, at the upper opening edge of the machine room so that the second hood member is able to be opened and closed; and
a second fixing portion that fixes the lower edge portion positioned between the second cutout edge portion and the lower edge portion provided with the hingedly second support portion, to the upper opening edge of the machine room.

2. The hood device according to claim 1, wherein the first hood member comprises a reinforcement deformation portion having a recessed cross section and provided along the first cutout edge portion.

3. The hood device according to claim 2, wherein the first hood member comprises a tubular reinforcement structure formed by integrating a band-like reinforcement plate along the reinforcement deformation portion.

4. The hood device according to claim 1, wherein the pressing portion of the first hood member is a resilient seal member.

5. A working machine comprising:
a machine body; and
a working machine mounted on the machine body,
the working machine further comprising:
a machine room provided in the machine body;
an engine installed in the machine room;
a cooling unit installed in the machine room adjacently to an engine; and
a hood device comprising:
a first hood member covering the engine from a top thereof which bulges upward and which is open at a lower side thereof, the first hood member being provided at a part of an upper opening of a machine room so as to be able to be opened and closed and being fixed to an upper opening edge of the machine room in a closed state; and
a second hood member covering the cooling unit from a top thereof which bulges upward and which is open at a lower side thereof, the second hood member including a part that is located adjacent to the first hood member and that overlaps a part of the first hood member, the second hood member being provided at another part of the upper opening of the machine room so as to be able to be opened and closed and being fixed to the upper opening edge of the machine room in a closed state, wherein
the first hood member comprises:
a first cutout edge portion formed by cutting out a partial side of the first hood member to be an opening and laid on top of the second hood member; and
a pressing portion provided along the first cutout edge portion so as to project downward, and
the second hood member comprises:
a second cutout edge portion formed by cutting out a partial side surface positioned under the first cutout edge portion to be an opening; and
a groove portion to be pressed, formed along the second cutout edge portion and at a position corresponding to the pressing portion of the first hood member, the groove portion to be pressed having an upward-facing recessed cross section.

6. The working machine according to claim 5, wherein the pressing portion of the first hood member is a resilient seal member.

7. The working machine according to claim 5, wherein the first hood member comprises a reinforcement deformation portion having a recessed cross section and provided along the first cutout edge portion.

8. The working machine according to claim 7, wherein the first hood member comprises a reinforcement deformation portion having a recessed cross section and provided along the first cutout edge portion.

9. The working machine according to claim 5, wherein the first hood member comprises :
a first hingedly support portion that hingedly supports one of two lower edge portions positioned across the first cutout edge portion, at the upper opening edge of the machine room so that the first hood member is able to be opened and closed; and
a first fixing portion that fixes the other of the two lower edge portions positioned across the first cutout edge portion, to the upper opening edge of the machine room, and
the second hood member comprises:
a second hingedly support portion that hingedly supports the lower edge portion positioned opposite the second cutout edge portion, at the upper opening edge of the machine room so that the second hood member is able to be opened and closed; and
a second fixing portion that fixes the lower edge portion positioned between the second cutout edge portion and the lower edge portion provided with the hingedly second support portion, to the upper opening edge of the machine room.

* * * * *